(12) United States Patent
Lee et al.

(10) Patent No.: US 10,910,663 B2
(45) Date of Patent: Feb. 2, 2021

(54) SECONDARY BATTERY

(71) Applicants: Samsung Electronics Co., Ltd., Suwon-si (KR); Samsung SDI Co., Ltd., Yongin-si (KR)

(72) Inventors: Dooyeon Lee, Yongin-si (KR); Makoto Odawara, Yokohama (JP)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 133 days.

(21) Appl. No.: 16/100,339

(22) Filed: Aug. 10, 2018

(65) Prior Publication Data

US 2019/0198908 A1  Jun. 27, 2019

(30) Foreign Application Priority Data

Dec. 27, 2017 (KR) .......... 10-2017-0181431

(51) Int. Cl.
*H01M 2/00* (2006.01)
*H01M 10/04* (2006.01)
(Continued)

(52) U.S. Cl.
CPC ............ *H01M 10/04* (2013.01); *H01M 2/02* (2013.01); *H01M 2/024* (2013.01); *H01M 2/0217* (2013.01); *H01M 2/14* (2013.01); *H01M 2/30* (2013.01); *H01M 4/382* (2013.01); *H01M 10/0463* (2013.01); *H01M 10/0468* (2013.01); *H01M 10/052* (2013.01); *H01M 10/0585* (2013.01); *H01M 2004/021* (2013.01); *H01M 2004/027* (2013.01); *H01M 2004/028* (2013.01)

(58) Field of Classification Search
CPC ............ H01M 10/04; H01M 10/0463; H01M 10/0468; H01M 10/052; H01M 10/0585;
(Continued)

(56) References Cited

U.S. PATENT DOCUMENTS 6,326,103 B1 * 12/2001 Ido .......... H01M 2/024
429/148
9,136,507 B2   9/2015 Lee et al.
(Continued)

FOREIGN PATENT DOCUMENTS

EP    0928035 A1   7/1999
JP    3331649 B2   7/2002
(Continued)

*Primary Examiner* — Jane J Rhee
(74) *Attorney, Agent, or Firm* — Cantor Colburn LLP

(57) ABSTRACT

A secondary battery includes an electrode assembly including a negative electrode layer, a separation film and a positive electrode layer arranged in a first direction; and a case in which the electrode assembly is accommodated, the case including a first pressing portion which faces a first side surface of the electrode assembly accommodated in the case and applies a first pressing force to the electrode assembly along the first direction. The first pressing portion includes: a first surface facing the first side surface of the electrode assembly accommodated in the case; and a second surface opposite to the first surface and exposed outside the case, the second surface of the first pressing portion including a plurality of first curved grooves arranged along the first side surface of the electrode assembly accommodated in the case and lengthwise extending in a second direction crossing the first direction.

18 Claims, 12 Drawing Sheets

(51) Int. Cl.
*H01M 4/38* (2006.01)
*H01M 2/30* (2006.01)
*H01M 2/02* (2006.01)
*H01M 2/14* (2006.01)
*H01M 4/02* (2006.01)
*H01M 10/052* (2010.01)
*H01M 10/0585* (2010.01)

(58) Field of Classification Search
CPC .... H01M 10/027; H01M 10/021; H01M 2/02; H01M 2/0217; H01M 2/024; H01M 2/14; H01M 2/30; H01M 4/382
See application file for complete search history.

(56) References Cited

U.S. PATENT DOCUMENTS

| | | | |
|---|---|---|---|
| 2014/0093762 | A1 | 4/2014 | Goh et al. |
| 2016/0149224 | A1* | 5/2016 | Okuno ................ H01M 4/13 |
| | | | 429/345 |

FOREIGN PATENT DOCUMENTS

| | | |
|---|---|---|
| JP | 2017-064609 A | 4/2017 |
| JP | 2017-076556 A | 4/2017 |
| KR | 10-0659848 B1 | 12/2006 |
| KR | 10-1382554 B1 | 4/2014 |
| KR | 10-1464965 B1 | 11/2014 |
| KR | 1020160074209 A | 6/2016 |

* cited by examiner

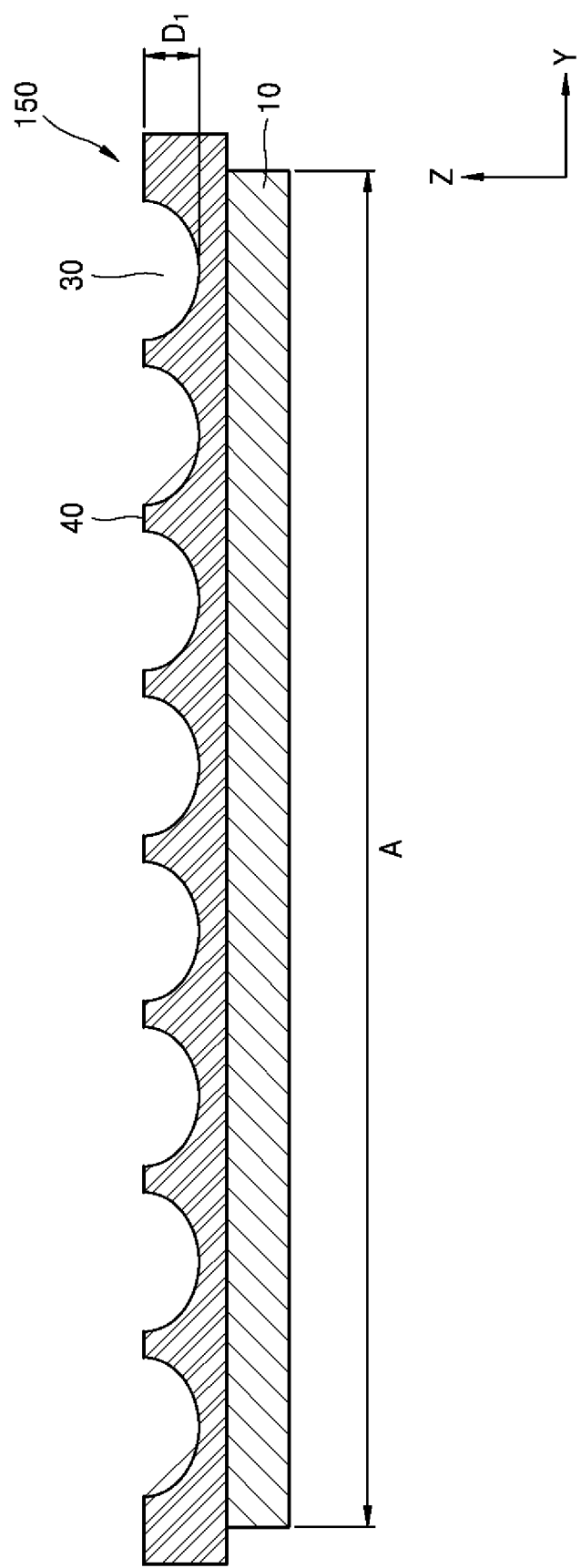

SECONDARY BATTERY

CROSS-REFERENCE TO RELATED APPLICATION

This application claims priority to Korean Patent Application No. 10-2017-0181431, filed on Dec. 27, 2017, and all the benefits accruing therefrom under 35 U.S.C. § 119, the content of which is incorporated herein in its entirety by reference.

BACKGROUND

1. Field

The present disclosure relates to a secondary battery in which an electrode assembly is accommodated in a case.

2. Description of the Related Art

Unlike primary batteries, secondary batteries are repeatedly rechargeable and dischargeable. Low-capacity secondary batteries may be used in small portable electronic devices such as cellular phones, notebook computers and camcorders, and high-capacity secondary batteries may be used as power for driving a motor of hybrid cars, etc.

Relatively high-output secondary batteries have been developed using a non-aqueous electrolyte having relatively high energy density. High-output secondary batteries are formed by connecting a plurality of secondary batteries in series and may be used in driving devices requiring relatively high power, for example, driving a motor of electric cars, etc.

SUMMARY

Provided is a secondary battery including: an electrode assembly including a negative electrode layer, a separation film and a positive electrode layer arranged in a first direction; and a case in which the electrode assembly is accommodated, the case including a first pressing portion which faces a first side surface of the electrode assembly accommodated in the case and applies a first pressing force to the electrode assembly along the first direction. The first pressing portion includes: a first surface facing the first side surface of the electrode assembly accommodated in the case; and a second surface opposite to the first surface and exposed outside the case, the second surface of the first pressing portion including a plurality of first curved grooves arranged along the first side surface of the electrode assembly accommodated in the case and lengthwise extending in a second direction crossing the first direction.

Within the first pressing portion, a cross-section of the plurality of first curved grooves may lengthwise extend in the first direction and may be one of a semicircle shape, an arch shape and a parabolic shape each including a predetermined curvature.

Within the first pressing portion, a ratio of a depth of each of the plurality of first curved grooves in the first direction to a width of the each of the plurality of first curved grooves in a third direction crossing each of the first direction and the second direction may be equal to or greater than about $1/15$ and less than or equal to about $1/5$.

Within the first pressing portion, the plurality of first curved grooves may be arranged in the third direction along the first side surface of the electrode assembly accommodated in the case, and along the third direction, an arrangement ratio of the plurality of first curved grooves may be equal to or greater than about one groove per centimeter and less than or equal to about two grooves per centimeter.

The case may further include a second pressing portion which is opposite to the first pressing portion with the electrode assembly therebetween and applies a second pressing force to the electrode assembly along the first direction, opposing side portions respectively connecting the first pressing portion and the second pressing portion to each other, and a bottom portion connecting the first pressing portion, the second pressing portion and each of the side portions to each other.

The second pressing portion may include: a first surface facing a second side surface of the electrode assembly accommodated in the case, the second side surface opposite to the first side surface of the electrode assembly; and a second surface opposite to the first surface of the second pressing portion and exposed outside the case, the second surface of the second pressing portion including a plurality of second curved grooves arranged along the second side surface of the electrode assembly accommodated in the case and lengthwise extending in the second direction crossing the first direction.

Within the second pressing portion, a cross-section of each of the plurality of second curved grooves may lengthwise extend in the first direction may be one of a semicircle shape, an arch shape and a parabolic shape each including a predetermined curvature.

Within the second pressing portion, a ratio of a depth of each of the plurality of second curved grooves in the first direction to a width of the each of the plurality of second curved grooves in a third direction crossing each of the first direction and the second direction may be equal to or greater than about $1/15$ and less than or equal to about $1/5$.

The case may further include an opening opposite to the bottom portion and through which an inner space of the case is exposed to outside the case, and the secondary battery may further include a cap plate coupled to the case at the opening to close the case.

Provided is a secondary battery including: an electrode assembly including a negative electrode layer, a separation film and a positive electrode layer arranged in a first direction; a case in which the electrode assembly is accommodated, the case including a first exterior wall portion exposed to outside the case and facing a first side surface of the electrode assembly accommodated in the case; and a first pressing portion which is arranged between the first side surface of the electrode assembly accommodated in the case and the first exterior wall portion of the case and applies a first pressing force to the electrode assembly along the first direction. The first pressing portion includes: a first surface facing the first side surface of the electrode assembly accommodated in the case; and a second surface opposite to the first surface, the second surface of the first pressing portion including a plurality of first curved grooves arranged along the first side surface of the electrode assembly and lengthwise extending in a second direction crossing the first direction.

Within the first pressing portion, a cross-section of each of the plurality of first curved grooves may lengthwise extend in the first direction may be one of a semicircle shape, an arch shape and a parabolic shape each including a predetermined curvature.

Within the first pressing portion, a ratio of a depth of each of the plurality of first curved grooves in the first direction to a width of the each of the plurality of first curved grooves in a third direction crossing each of to the first direction and the second direction may be equal to or greater than about $1/15$ and less than or equal to about $1/5$.

Within the first pressing portion, the plurality of first curved grooves may be arranged the third direction along the first side surface of the electrode assembly accommodated in the case, and along the third direction, an arrangement ratio of the plurality of first curved grooves may be equal to or greater than about one groove per centimeter and less than or equal to about two grooves per centimeter in the third direction.

The case may further include a second exterior wall portion opposite to the first exterior wall portion, opposing side portions each connecting the first exterior wall portion and the second exterior wall portion to each other, and a bottom portion connecting the first exterior wall portion, the second exterior wall portion and each of the side portions to each other.

The secondary battery may further include a second pressing portion which is arranged between a second side surface of the electrode assembly accommodated in the case opposite to the first side surface of the electrode assembly and the second exterior wall portion of the case and applies a second pressing force to the electrode assembly along the first direction. The second pressing portion may include: a first surface facing the second side surface of the electrode assembly accommodated in the case; and a second surface opposite to the first surface of the second pressing portion, and including a plurality of first curved grooves arranged along the second side surface of the electrode assembly accommodated in the case and lengthwise extending in the second direction crossing the first direction.

Within the second pressing portion, a cross-section of each of the plurality of second curved grooves may be lengthwise extended in the first direction and may be one of a semicircle shape, an arch shape and a parabolic shape each including a predetermined curvature.

Within the second pressing portion, a ratio of a depth of each of the plurality of first curved grooves in the first direction to a width of the each of the plurality of first curved grooves in a third direction crossing each of to the first direction and the second direction may be equal to or greater than about $1/15$ and less than or equal to about $1/5$.

The case may further include an opening opposite to the bottom portion and through which an inner space of the case is exposed to outside the case, and the secondary battery may further include a cap plate coupled to the case at the opening to close the case.

BRIEF DESCRIPTION OF THE DRAWINGS

These and/or other features will become apparent and more readily appreciated from the following description of the embodiments, taken in conjunction with the accompanying drawings in which:

FIG. 4A is a cross-sectional view of a first pressing portion of a secondary battery according to an embodiment;

DETAILED DESCRIPTION

Figure 1:
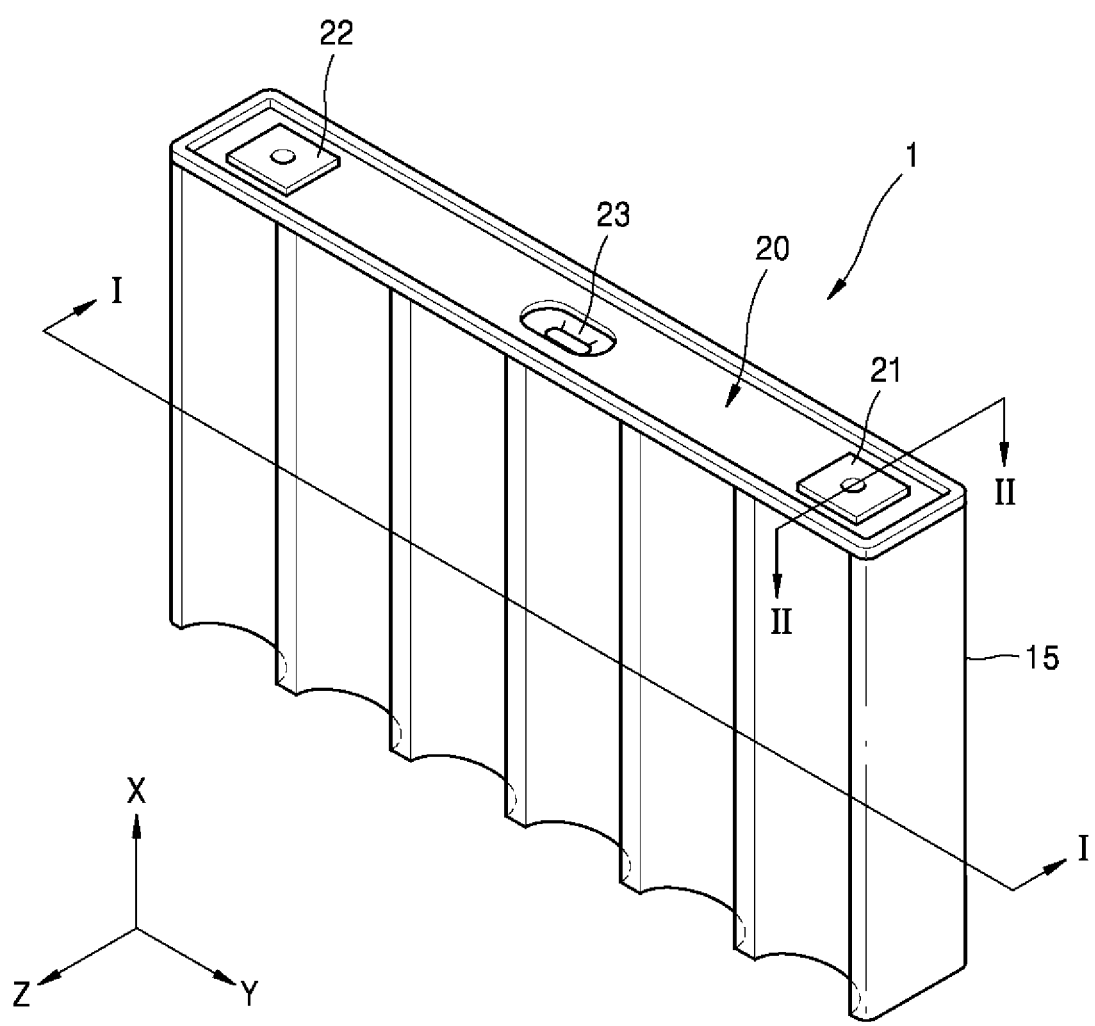
FIG. 1 is a perspective view of a secondary battery according to an embodiment.

Reference will now be made in detail to embodiments, examples of which are illustrated in the accompanying drawings, where like reference numerals refer to like elements throughout, and the size of each element shown in the drawings may be exaggerated for clarity and convenience of description. In this regard, the present embodiments may have different forms and should not be construed as being limited to the descriptions set forth herein. Accordingly, the embodiments are merely described below, by referring to the figures, to explain features.

Also, when an element is referred to as being related to another element such as being "over" or "on" another element, the element may be directly on the other element or may be above the other element without contact. In contrast, when an element is referred to as being related to another element such as being "directly over" or "directly on" another element, no intervening layers are present between the elements.

In addition, in the present specification, "one surface" and "the other surface" refer to two opposite surfaces, and "one direction" and "the other direction" refer to two opposite directions.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Secondary batteries include an electrode assembly including a positive electrode layer and a negative electrode layer respectively on opposing surfaces of a separation film. As recharging and discharging are repeated in the electrode assembly of a secondary battery, overheating may occur, or an electrolyte may be dissolved. Accordingly, respective gaps between the positive electrode layer, the separation film and the negative electrode layer may undesirably widen, and a swelling phenomenon in which the electrode assembly swells may undesirably occur.

Figure 2A:
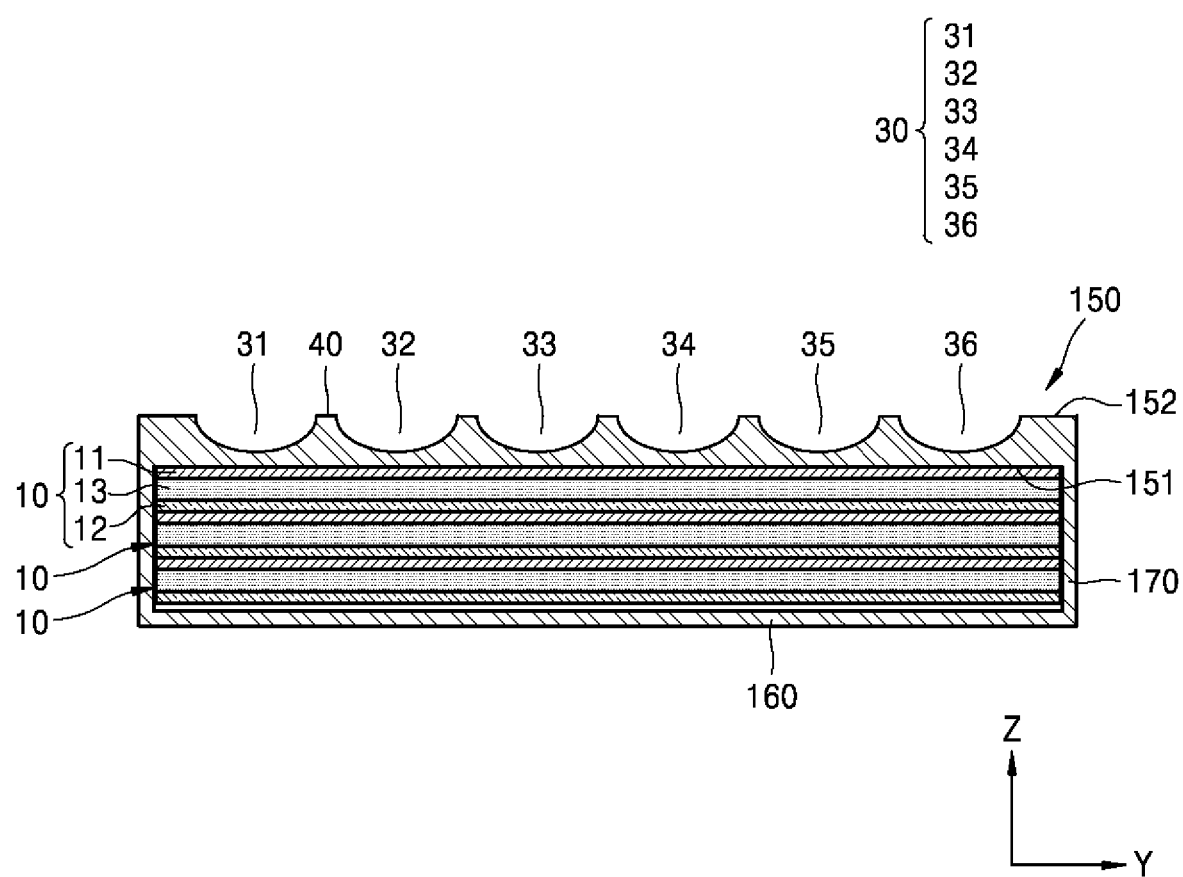
FIG. 2A is a cross-sectional view taken along line I-I of FIG. 1, according to an embodiment.
Figure 2B:
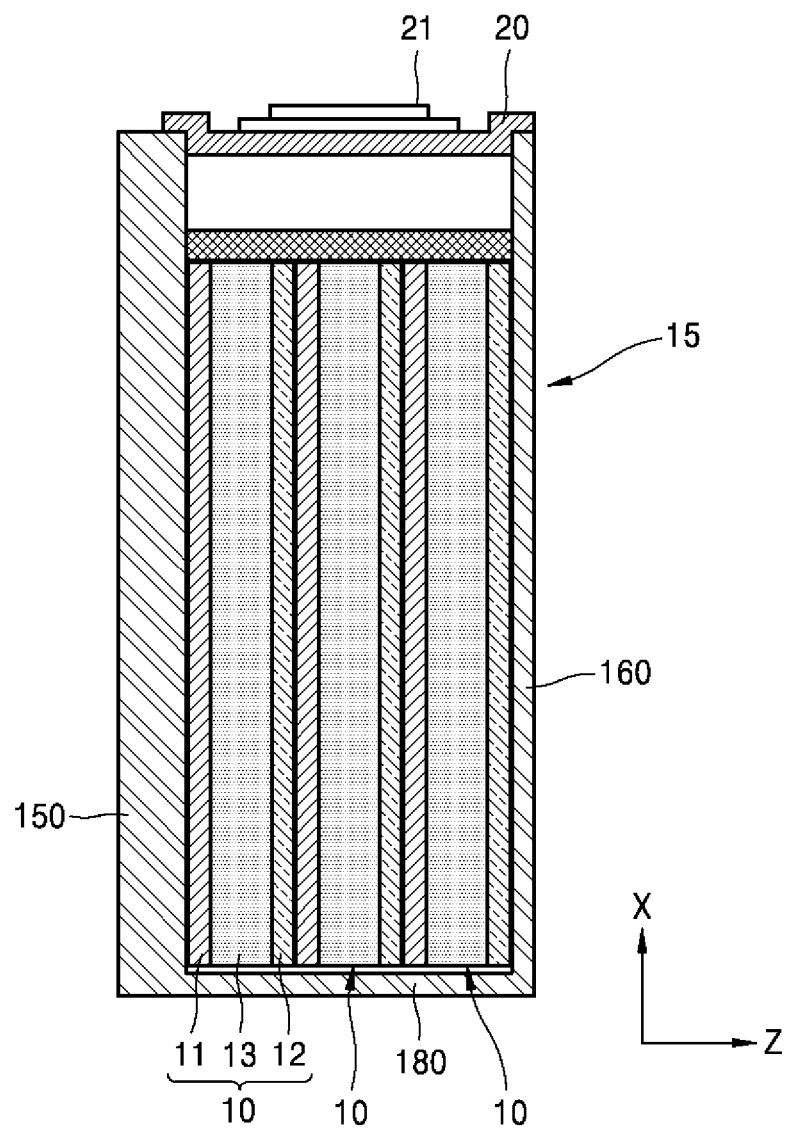
FIG. 2B is a cross-sectional view taken along line II-II of FIG. 1, according to an embodiment.

FIG. 1 is a perspective view of a secondary battery 1 according to an embodiment. FIG. 2A is a cross-sectional view taken along line I-I of FIG. 1, according to an embodiment. FIG. 2B is a cross-sectional view taken along line II-II of FIG. 1, according to an embodiment.

Referring to FIGS. 1 to 2B, the secondary battery 1 according to an embodiment may include an electrode assembly 10 with which recharging and discharging operations of the secondary battery 1 are performed, a case 15 accommodating the electrode assembly 10, a cap plate 20 coupled to the case 15 at an opening of the case 15, and a negative electrode terminal 21 and a positive electrode terminal 22 each installed at the cap plate 20.

One electrode assembly 10 or a plurality of electrode assemblies 10 may be provided. A single electrode assembly 10 may include a negative electrode layer 11, a positive electrode layer 12, and a separation film 13 provided as an insulator between the electrode layers 11 and 12. The electrode assembly 10 according to an example may be assembled by stacking the negative electrode layer 11 and the positive electrode layer 12, each of which is formed as a single plate, with the separation film 13 therebetween in a thickness direction, for example, a first direction Z, or may be assembled by folding and stacking the negative electrode layer 11, the separation film 13 and the positive electrode layer 12 in a zigzag structure in the first direction Z. As an example, the negative electrode layer 11 may include, for example, a lithium (Li) metal or a Li metal alloy. However, the present disclosure is not limited thereto, and the material of the negative electrode layer 11 may vary.

The case 15 is an accommodation member in which the electrode assembly 10 is accommodated. The case 15 may form an outer surface of the secondary battery 1. The case 15 according to an example may have an angled shape in which a space in which the electrode assembly 10 is accommodated generally has a rectangular parallelepiped shape. In this regard, an opening of the case 15 through which the electrode assembly 10 is inserted into the case 15 exposes an inner space of the case 15 to outside thereof. The opening of the case 15 that connects the outside and the inner space to each other may be defined at one side of the rectangular parallelepiped shape of the space in which the electrode assembly 10 is accommodated. However, the present disclosure is not limited thereto, and the case 15 may be modified in shape and/or opening structure for use in various types of secondary batteries such as a Li polymer secondary battery or a cylindrical secondary battery.

According to an embodiment, the case 15 may include or define a first pressing surface (portion) 150 facing one side surface of the electrode assembly 10 and with which the electrode assembly 10 is pressed in the thickness direction of the negative electrode layer 11, the positive electrode layer 12 and the separation film 13, for example, in the first direction Z, a second pressing surface (portion) 160 opposite to the first pressing portion 150, both side surfaces or portions 170 connecting the first pressing portion 150 and the second pressing portion 160 to each other, and a bottom surface or portion 180. A process of applying a pressing force to the electrode assembly 10 by using the first pressing portion 150, according to an example, will be described below with reference to FIGS. 3 to 4B.

An opening which exposes an inner space of the case 15 to outside thereof, is defined at a side of the secondary battery 1 opposite to that at which the bottom surface 180 of the case 15 is disposed.

The cap plate 20 includes a relatively thin plate material and is installed at the opening of the case 15 to close the case 15 from outside thereof. The cap plate 20 disposed at the opening may form an upper surface of the secondary battery 1, and may form a collective case member along with the case 15. The cap plate 20 may include or defined therein a vent hole 23 with which inner pressure formed within the secondary battery 1 is decreased, and a vent plate (not shown) with which case 15 is opened or closed The negative electrode terminal 21 and the positive electrode terminal 22 may be electrically connected to the electrode assembly 10 at the inner space of the case 15, and from the inner space may pass through the cap plate 20 to be disposed outside the secondary battery 1. That is, at the inner space of the secondary battery 1, the negative electrode terminal 21 and the positive electrode terminal 22 may be electrically connected to the negative electrode layer 11 and the positive electrode layer 12 of the electrode assembly 10, respectively. Accordingly, the electrode assembly 10 may be electrically exposed outside of the case 15 through the negative electrode terminal 21 and the positive electrode terminal 22 connected to the electrode assembly 10 within the case 15.

Figure 3A:
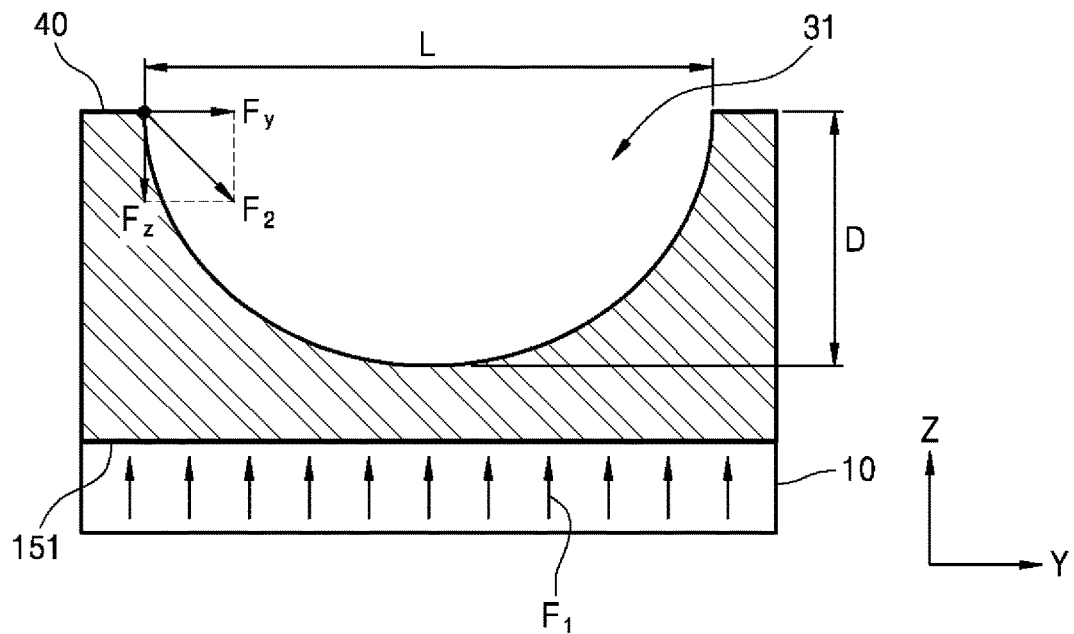
FIGS. 3A and 3B are respectively enlarged cross-sectional views of a curved groove in a secondary battery according to embodiments.
Figure 3B:
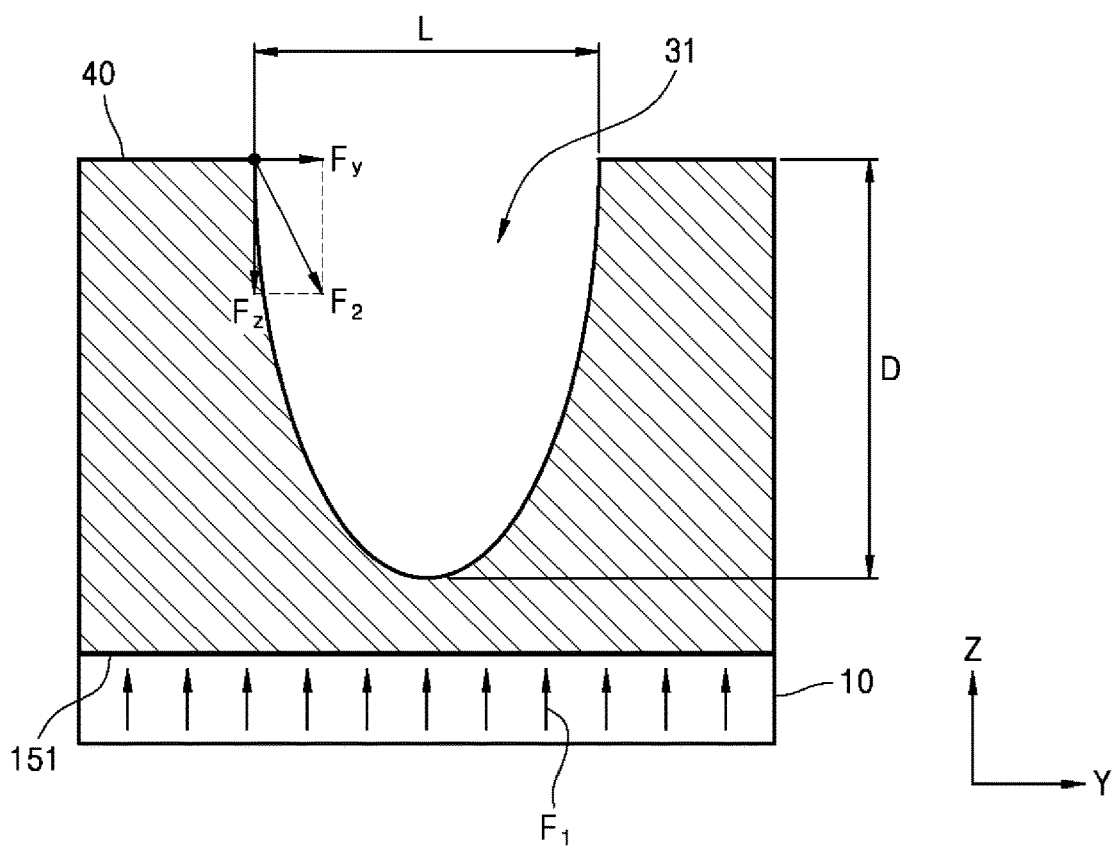
Figure 4B:
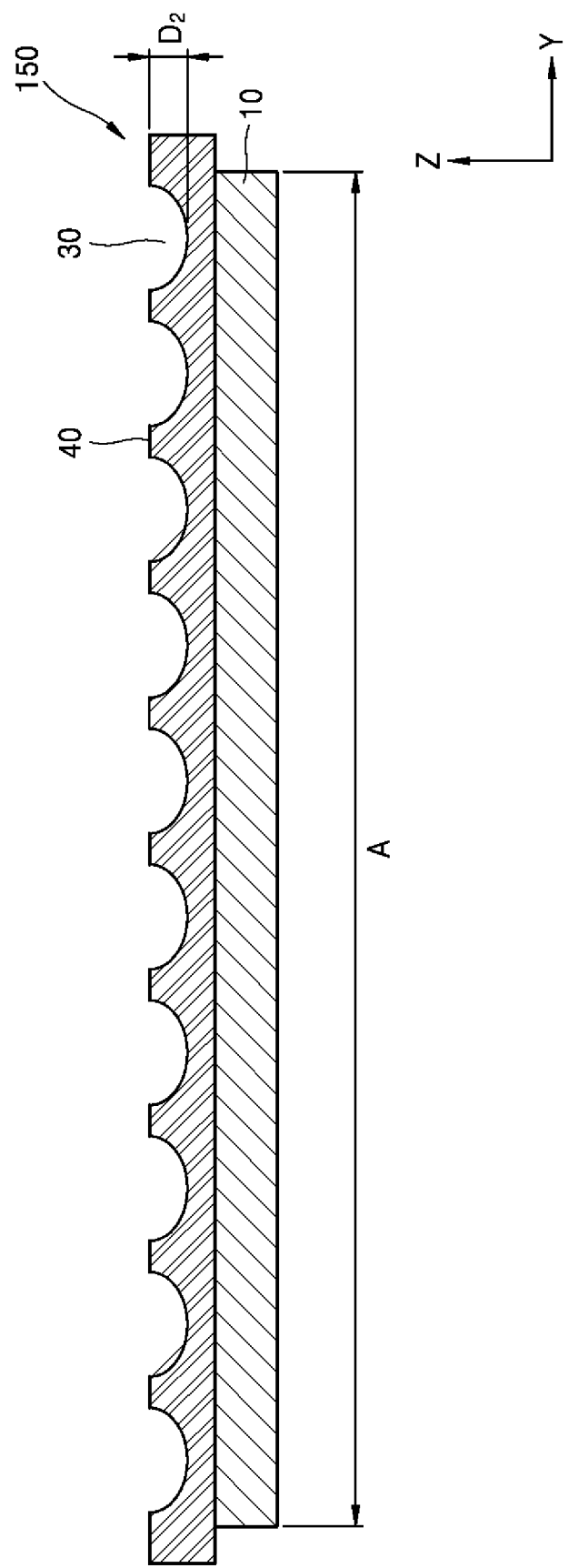
FIG. 4B is a cross-sectional view of a first pressing portion of a secondary battery according to another embodiment.

FIGS. 3A and 3B are enlarged cross-sectional views of a curved groove of a secondary battery according to an embodiment. FIG. 4A is a cross-sectional view of the first pressing portion 150 according to an embodiment. FIG. 4B is a cross-sectional view of the first pressing portion 150 according to another embodiment. For convenience of explanation, only the first pressing portion 150 of the case 15 and an electrode assembly 10 which is closest to the first pressing portion 150 among features of the secondary battery 1 are shown.

Referring to FIGS. 1 and 2A, a portion of the case 15 defines the first pressing portion 150 according to an embodiment. The first pressing portion 150 may include or define a first surface 151 facing one side surface of the electrode assembly 10 and a second surface 152 which is opposite to the first surface 151 and exposed outside the case 15. The first surface 151 according to an example may face one side surface of the electrode assembly 10 to be exposed to the inner space of the case 15.

The second surface 152 includes or defines a plurality of curved grooves 30 lengthwise extending in a second direction X which crosses the first direction Z such as being perpendicular to the first direction Z. The second surface 152 may face a mounting portion, for example, a battery mounting portion (not shown), of an electronic device within which the secondary battery 1 is mounted, such that a pressing force applied to the second surface 152 is transferred by the first pressing portion 150 to the electrode assembly 10 within the case 15 along the first direction Z.

The plurality of curved grooves 30 according to an embodiment may lengthwise extend in the second direction X perpendicular to the first direction Z. Also, adjacent grooves among the plurality of curved grooves 30 may be spaced apart from one another with a supporting surface 40 therebetween in a third direction Y which crosses each of the first direction Z and the second direction X such as being perpendicular thereto. However, the present disclosure is not limited thereto, and a length extension direction of the plurality of curved grooves 30 may be modified to have a predetermined angle with respect to the second direction X, and/or a spacing direction of the plurality of curved grooves 30 may also be modified to have a predetermined angle with respect to the third direction Y.

The surfaces of the grooves 30 and the supporting surfaces 40 may define an entirety of the second surface 152 of the case 15. A thickness of the case 15 along the first direction Z may be maximum at the supporting surface 40. That is, an overall thickness of the secondary battery 1 may be maximum at the supporting surface 40.

As an example, the plurality of curved grooves 30 may include first to sixth curved grooves 31 to 36 as shown in FIG. 2A. As used herein, the label 30 may be used to indicate a plurality of grooves (e.g., 31-36 in FIG. 2A) and/or any one of the individual grooves among the plurality of grooves (e.g., 31-36 in FIG. 2A). However, the present disclosure is not limited thereto, and the number of curved grooves included in the plurality of curved grooves 30 may be arbitrarily selected as necessary. According to an example, a longitudinal cross-section of each curved groove of the plurality of curved grooves 30 in the first direction Z may have a predetermined curvature. As an example, longitudinal sections of the first to sixth curved grooves 31 to 36 in the first direction Z may be curved with a predetermined curvature. In an embodiment, for example, longitudinal sections of the first to sixth curved grooves 31 to 36 in the first direction Z may be one of a semicircle shape, an arch shape, a portion of a hyperbolic shape and a parabolic shape.

Referring to FIGS. 3A and 3B, when the electrode assembly 10 according to an embodiment expands in the first direction Z such as due to a swelling phenomenon, a pressure $F_1$ may be applied from the electrode assembly 10 to the first surface 151 of the first pressing portion 150 in the first direction Z. In this regard, a repulsive force $F_2$ may be applied from the supporting surface 40 included in the second surface 152. While FIGS. 3A and 3B illustrated the curved groove 31, the features of FIGS. 3A and 3B may be applied to any of a number of the first to sixth curved grooves 31 to 36.

As described above, when a longitudinal section of the first curved groove 31 in the first direction Z is curved with a predetermined curvature, a ratio between a horizontal repulsive force $F_y$ and a vertical repulsive force $F_z$ applied from the supporting surface 40 may be determined according to a ratio between a depth D of the curved groove in the first direction Z and a width L of a curved groove in the third direction Y. In an embodiment, for example, when a ratio of the depth D of the curved groove to the width L of the curved groove increases, the horizontal repulsive force $F_y$ applied from the supporting surface 40 may decrease, whereas the vertical repulsive force $F_z$ applied from the supporting surface 40 may increase. In addition, when the ratio of the depth D of the curved groove to the width L of the curved groove decreases, the horizontal repulsive force $F_y$ may increase, whereas the vertical repulsive force $F_z$ may decrease. The depth D of the curved groove may be a maximum dimension of the curved groove along the first direction Z, while the width L of the curved groove may be a maximum dimension of the curved groove along the third direction Y. The depth D of the curved groove may define a minimum thickness of the first pressing portion 150.

As an example, when a central portion of the first curved groove 31 which is disposed furthest from the supporting surface 40 is deformed in the first direction Z due to the pressure $F_1$ applied by the electrode assembly 10, the ratio of the depth D of the curved groove to the width L of the curved groove may be determined to minimize a deformation amount of the central portion of the first curved groove 31. In an embodiment, for example, a longitudinal section of a groove of the first curved groove 31 in the first direction Z may be one of a semicircle shape, an arch shape, a portion of a hyperbolic shape and a parabolic shape. In this regard, the ratio of the depth D of the curved groove to the width L of the curved groove may be equal to or greater than about $\frac{1}{15}$ and less than or equal to about $\frac{1}{5}$.

Referring to FIGS. 4A and 4B, when a length portion of the first pressing portion 150 in which the plurality of grooves are defined according to an embodiment has the same length A in the third direction Y, and a ratio of the depth D of each of the curved grooves to the width L of the curved grooves is constant, the number of the plurality of curved grooves 30 arranged along the length portion of the first pressing portion 150 may be determined according to the depth D of the curved grooves.

As an example, for the same length A, when a curved grooves 30 have a first depth $D_1$ as shown in FIG. 4A, the plurality of curved grooves 30 have a second depth $D_2$ as shown in FIG. 4B, and the first depth $D_1$ is greater than the second depth $D_2$, the first pressing portion 150 shown in FIG. 4A may include eight curved grooves 30, whereas the first pressing portion 150 shown in FIG. 4B may include ten curved grooves 30. Although the depth D of the curved groove may be small enough not to increase an overall thickness of the secondary battery 1 in the first direction Z, the number of the plurality of curved grooves 30 for securing the same repulsive force $F_2$ may increase when the depth D of the curved groove decreases. Accordingly, an arrangement ratio of the plurality of curved grooves 30 in the third direction Y may be determined according to the depth D of the curved groove. In more detail, an arrangement ratio of the plurality of curved grooves 30 in the third direction Y may be determined according to an overall thickness of the secondary battery 1 in the first direction Z. As an example, the arrangement ratio of the plurality of curved grooves 30 in the third direction Y may be equal to or greater than one groove per centimeter and less than or equal to two grooves per centimeter, but the present disclosure is not limited thereto.

Figure 5:
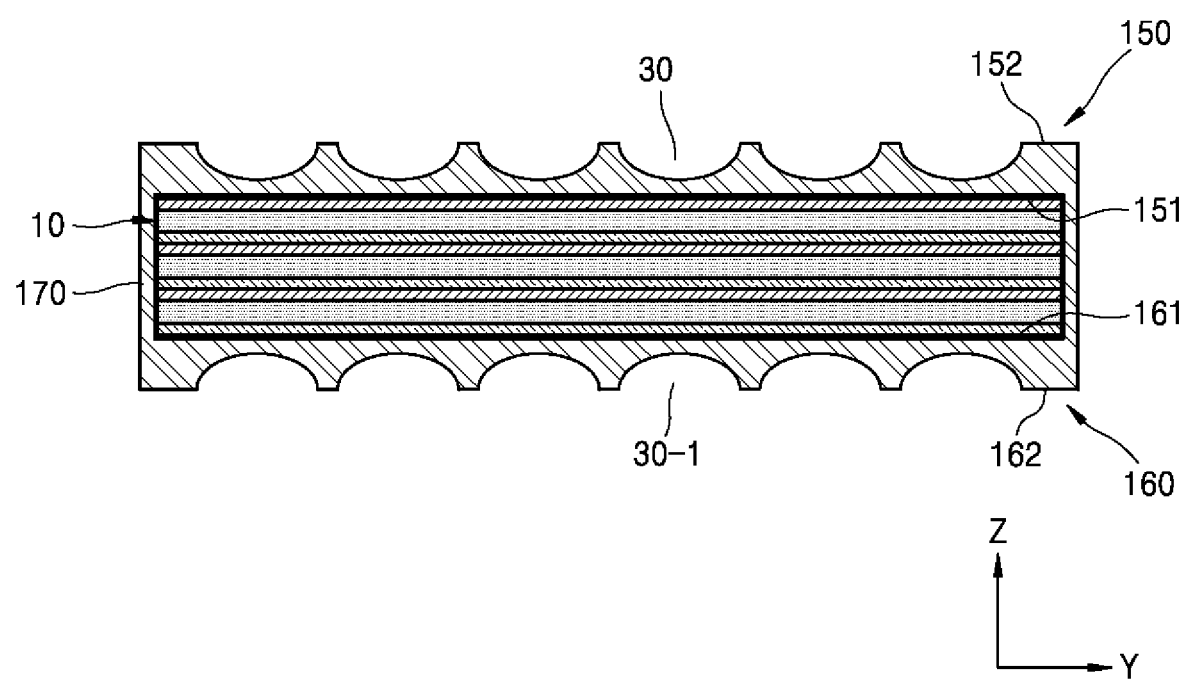
FIG. 5 is a cross-sectional view taken along line I-I of FIG. 1, according to another embodiment.

FIG. 5 is a cross-sectional view taken along line I-I of FIG. 1, according to another embodiment.

Referring to FIGS. 1 and 5, the second pressing portion 160 according to an embodiment may include or define a first surface 161 facing one side surface of the electrode assembly 10 and a second surface 162 which is opposite to the first surface 161 and exposed outside the case 15. The first surface 161 according to an example may face one side surface of the electrode assembly 10 to be exposed to the inner space of the case 15.

The second surface 162 includes or defines a curved groove 30-1 provided in plurality lengthwise extending in the second direction X which crosses the first direction Z such as being perpendicular to the first direction Z. The second surface 162 may face a mounting portion, for example, a battery cover portion (not shown), of an electronic device within which the secondary battery 1 is mounted, such that a pressing force applied to the second surface 162 is transferred by the second pressing portion 160 to the electrode assembly 10 within the case 15 along the first direction Z. Details of the number and shape of the plurality of curved grooves 30-1 in the second pressing portion 160 are substantially the same as those of the number and shape of the plurality of curved grooves 30 in the first pressing portion 150, and thus, a description thereof is omitted below for convenience.

As described above, when the plurality of curved grooves 30 and/or 30-1 are arranged at an exterior wall portion of the case 15 surrounding the electrode assembly 10, for example, the first pressing portion 150 and/or the second pressing portion 160, a pressing force is transferred to the electrode assembly 10 by the first and/or second pressing portion 150 and/or 160 at the plurality of curved grooves thereof to maintain gaps between the negative electrode layer 11, the separation film 13 and the positive electrode layer 12 included in the electrode assembly 10 within a set range, and thus, a swelling phenomenon may be controlled.

Figure 6:
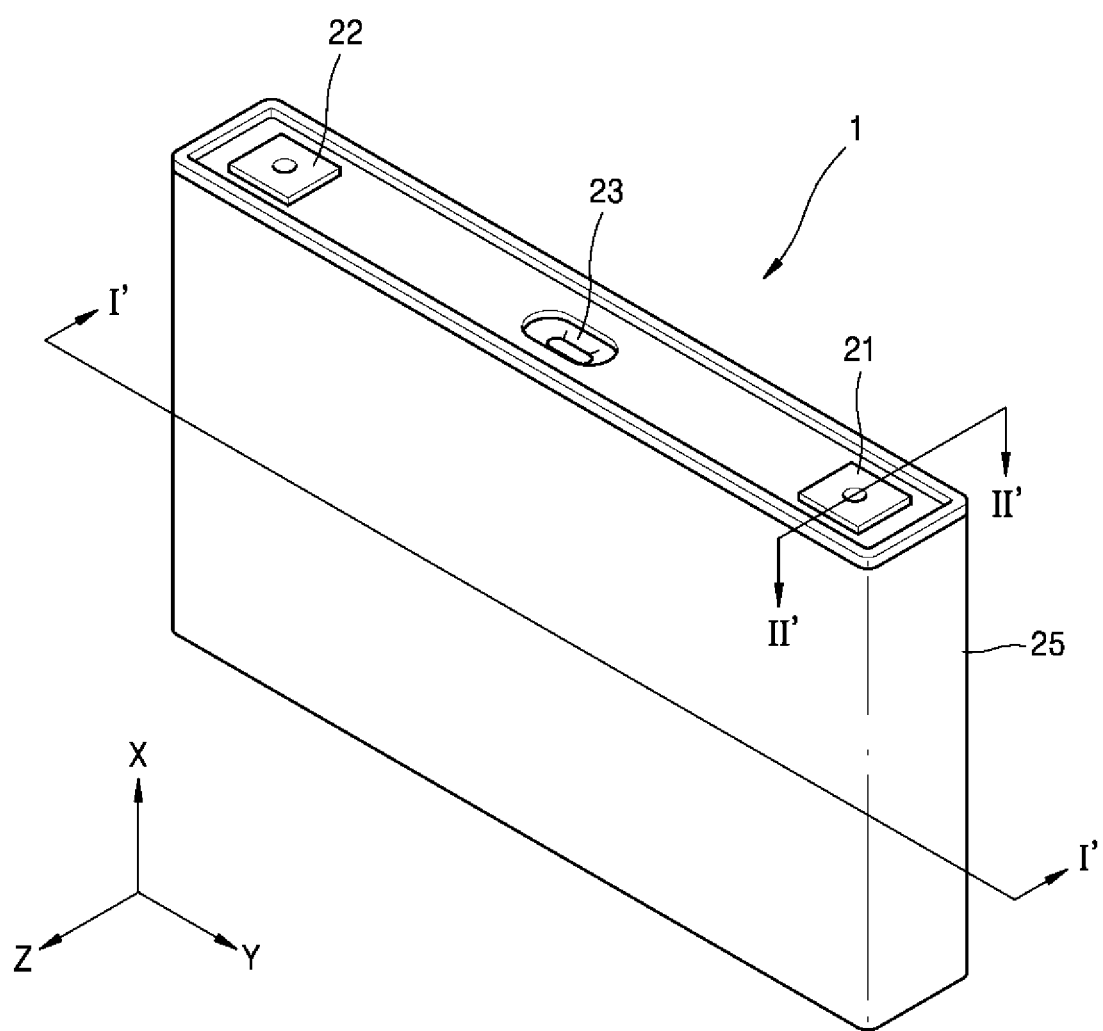
FIG. 6 is a perspective view of a secondary battery according to another embodiment.
Figure 7A:
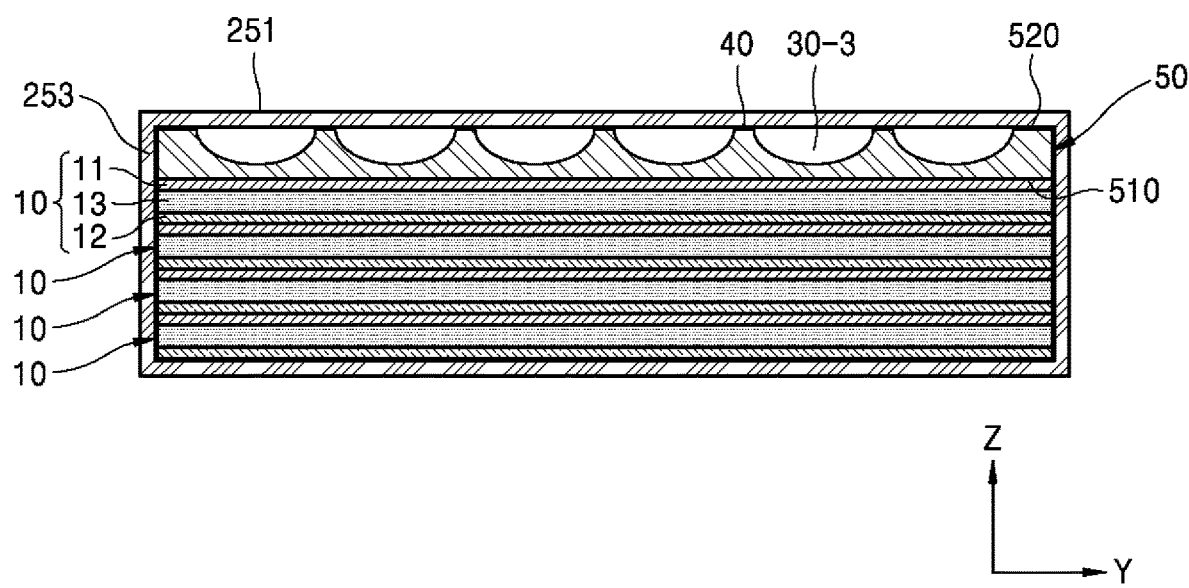
FIG. 7A is a cross-sectional view taken along line I'-I' of FIG. 6, according to an embodiment.
Figure 7B:
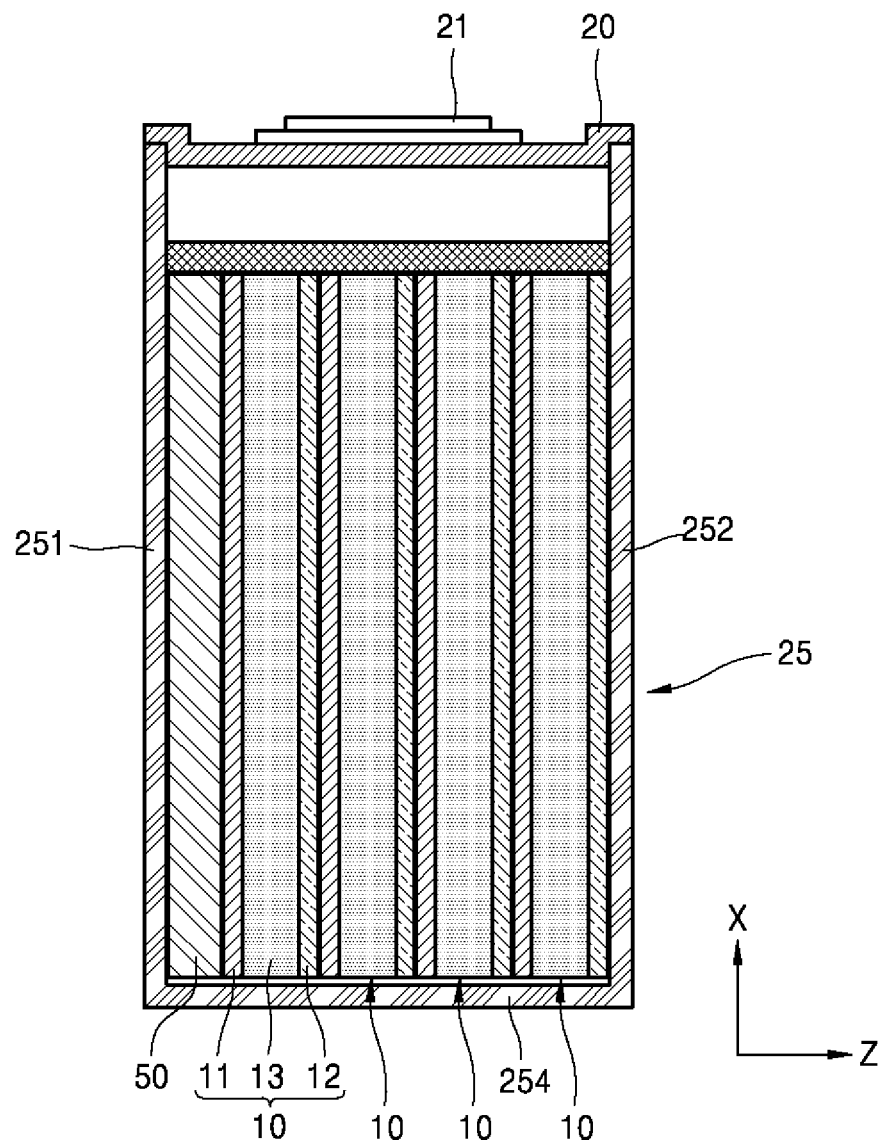
FIG. 7B is a cross-sectional view taken along line II'-II' of FIG. 6, according to an embodiment.

FIG. 6 is a perspective view of the secondary battery 1 according to another embodiment. FIG. 7A is a cross-sectional view taken along line I'-I' of FIG. 6, according to an embodiment. FIG. 7B is a cross-sectional view taken along line II'-II' of FIG. 6, according to an embodiment.

Referring to FIGS. 6 to 7B, the secondary battery 1 according to an embodiment may include the electrode assembly 10 with which recharging and discharging operations of the secondary battery 1 are performed, a case 25 accommodating the electrode assembly 10, the cap plate 20 coupled to the case 25 at an opening of the case 25, the negative electrode terminal 21 and the positive electrode terminal 22 each installed at the cap plate 20, and a first pressing portion 50. Details of the electrode assembly 10, the cap plate 20, the negative electrode terminal 21, and the positive electrode terminal 22 are substantially the same as those described with reference to FIG. 1, and thus, a description thereof is omitted below for convenience.

The case 25 is an accommodation member in which the electrode assembly 10 is accommodated. The case 25 according to an example may have an angled shape in which a space in which the electrode assembly 10 is accommodated is generally a rectangular parallelepiped shape. In this regard, an opening of the case 25 through which the electrode assembly 10 is inserted into the case 25 exposes an inner space of the case 25 to outside thereof. The opening of the case 25 that connects the outside and the inner space to each other may be defined at one side of the rectangular parallelepiped shape of the space in which the electrode assembly 110 is accommodated.

According to an embodiment, the case 25 may include a first exterior wall portion 251 facing one side surface of the electrode assembly 10 and with which the electrode assembly 10 is pressed in a thickness direction of the electrode assembly 10, for example, in the first direction Z, a second exterior wall portion 252 facing the first exterior wall portion 251, both side surface (portions) 253 connecting the first exterior wall portion 251 and the second exterior wall portion 252 to each other, and a bottom surface (portion) 254.

The first pressing portion 50 is a pressing member between the electrode assembly 10 and the case 25 and a pressing force applied to the first pressing portion 150 is transferred to the electrode assembly 10. As an example, the first pressing portion 50 may be between one side surface of the electrode assembly 10 and the first exterior wall portion 251 of the case 25. In this regard, a first surface 510 of the first pressing portion 50 may face the one side surface of the electrode assembly 10, and a second surface 520 which is opposite to the first surface 510 may face the first exterior wall portion 251.

As an example, a groove 30-3 provided in plurality may be arranged along the second surface 520 of the first pressing portion 50. The plurality of curved grooves 30-3 according to an embodiment may lengthwise extend in the second direction X which crosses the first direction Z such as being perpendicular to the first direction Z. In addition, adjacent grooves 30-3 among the plurality of curved grooves 30-3 may be spaced from one another with the supporting surface 40 therebetween in the third direction Y which crosses each of the first direction Z and the second direction X such as to be perpendicular to the first direction Z and the second direction X.

The surfaces of the grooves 30-3 and the supporting surfaces 40 may define an entirety of the second surface 162 of the first pressing portion 50. A thickness of the first pressing portion 50 along the first direction Z may be maximum at the supporting surface 40.

In an embodiment, for example, when the electrode assembly 10 according to an embodiment expands in the first direction Z such as due to a swelling phenomenon, a pressure may be applied from the electrode assembly 10 to the first surface 510 of the first pressing portion 50 in the first direction Z. In this regard, a repulsive force may be applied from the supporting surface 40 of the second surface 520, and thus, the swelling phenomenon of the electrode assembly 10 may be reduced or effectively prevented. Details of the number and shape of the plurality of curved grooves 30-3 in the first pressing portion 50 are substantially the same as those of the number and shape of the plurality of curved grooves 30 in the first pressing portion 150 of the above embodiment, and thus, a description thereof is omitted below for convenience.

Figure 8A:
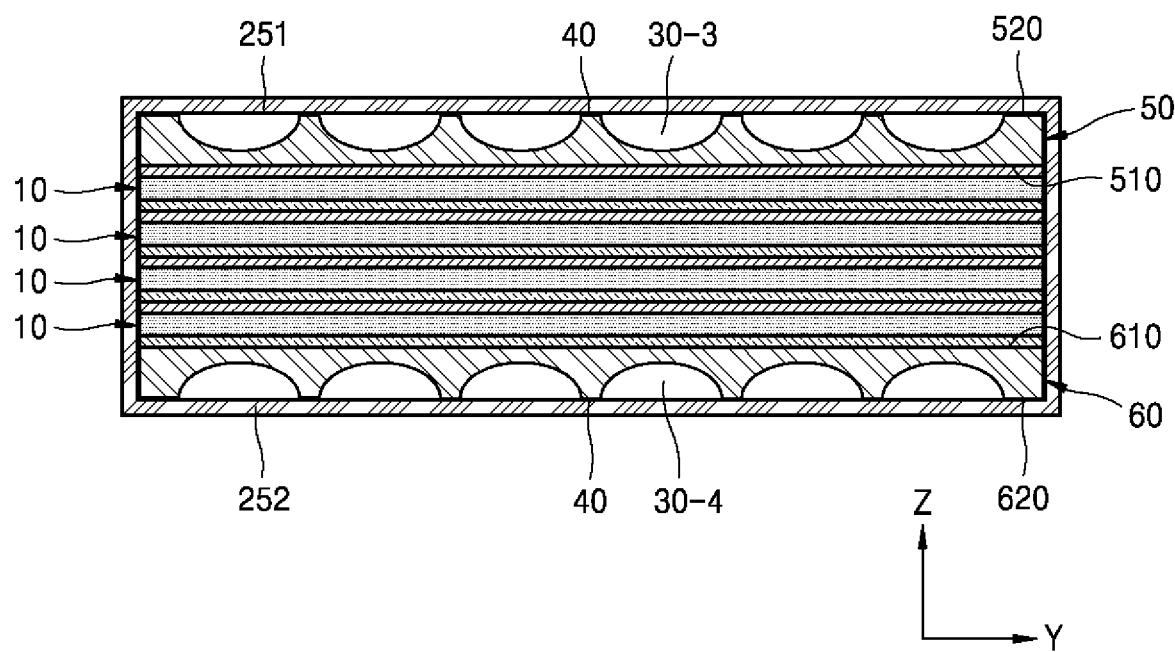
FIG. 8A is a cross-sectional view taken along line I'-I' of FIG. 6, according to another embodiment.
Figure 8B:
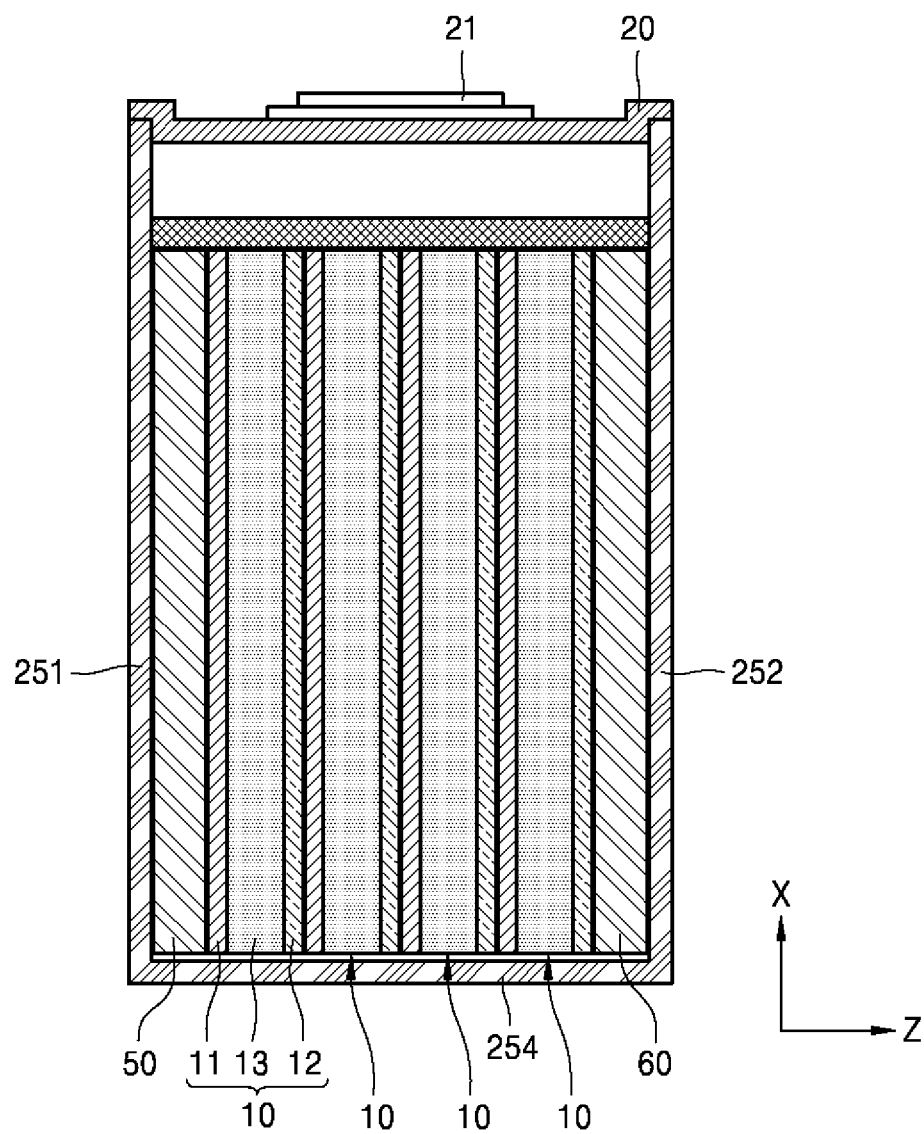
FIG. 8B is a cross-sectional view taken along line II'-II' of FIG. 6, according to another embodiment.

FIG. 8A is a cross-sectional view taken along line I'-I' of FIG. 6, according to another embodiment. FIG. 8B is a cross-sectional view taken along line II'-II' of FIG. 6, according to another embodiment.

Referring to FIGS. 6, 8A, and 8B, the secondary battery 1 according to an embodiment may further include a second pressing portion 60 between the electrode assembly 10 and the case 25, in more detail, between one side surface of the electrode assembly 10 and the second exterior wall portion 252 of the case 25. In this regard, a first surface 610 of the second pressing portion 60 may face one side surface of the electrode assembly 10, and a second surface 620 which is opposite to the first surface 610 may face the second exterior wall portion 252.

As an example, a plurality of curved grooves 30-4 may be arranged along the second surface 620 of the second pressing portion 60. Details of the number and shape of the plurality of curved grooves 30-4 in the second pressing portion 60 are substantially the same as those of the number and shape of the plurality of curved grooves 30 in the first pressing portion 150 of the above embodiment, and thus, a description thereof is omitted below for convenience. As described above, when the first pressing portion 50 or the second pressing portion 60 including the plurality of curved grooves 30-3 or 30-4 is between the case 25 surrounding the electrode assembly 10 and the electrode assembly 10, the electrode assembly 10 is pressed by the respective pressing portion at the plurality of curved grooves 30-3 and 30-4 to maintain gaps between the negative electrode layer 11, the separation film 13 and the positive electrode layer 12 included in the electrode assembly 10 within a set range, and thus, a swelling phenomenon may be controlled.

According to an embodiment, since a case surrounding an electrode assembly defines a pressing portion which presses the electrode assembly, and thus, gaps between a positive electrode layer, a separation film and a negative electrode layer included in the electrode assembly are maintained within a set range, a swelling phenomenon may be controlled.

According to another embodiment, since a pressing portion which is separate from a case and facing an electrode assembly presses the electrode assembly, and thus, gaps between a positive electrode layer, a separation film and a negative electrode layer included in the electrode assembly are maintained within a set range, a swelling phenomenon may be controlled.

It should be understood that embodiments described herein should be considered in a descriptive sense only and not for purposes of limitation. Descriptions of features within each embodiment should typically be considered as available for other similar features in other embodiments.

While one or more embodiments have been described with reference to the figures, it will be understood by those of ordinary skill in the art that various changes in form and details may be made therein without departing from the spirit and scope as defined by the following claims.

What is claimed is:

1. A secondary battery comprising:
   an electrode assembly comprising a negative electrode layer, a separation film and a positive electrode layer arranged along a first direction; and
   a case in which the electrode assembly is accommodated, the case comprising a first pressing portion which faces a first side surface of the electrode assembly accommodated in the case and applies a first pressing force to the electrode assembly along the first direction,
   wherein the first pressing portion comprises:
      a first surface facing the first side surface of the electrode assembly accommodated in the case; and
      a second surface opposite to the first surface and exposed outside the case, the second surface of the first pressing portion comprising a plurality of first curved grooves arranged along the first side surface of the electrode assembly accommodated in the case,
      wherein within the first pressing portion, the plurality of first curved grooves;
         include lengths extended along a second direction crossing the first direction,
         are arranged along a third direction crossing each of the first direction and second direction, and
         include depths as a maximum dimension along the first direction and widths as a maximum dimension along the third direction,
         wherein a ration of a depth of each of the plurality of first curved grooves along the first direction to a width of the each of the plurality of first curved grooves along the third direction is equal to or greater than about $\frac{1}{15}$ and less than or equal along about $\frac{1}{5}$.

2. The secondary battery of claim 1, wherein within the first pressing portion, a cross-section of each of the plurality of first curved grooves is one of a semicircle shape, an arch shape and a parabolic shape each comprising a predetermined curvature.

3. The secondary battery of claim 1, wherein within the first pressing portion,
   along the third direction, an arrangement ratio of the plurality of first curved grooves is equal to or greater than about one groove per centimeter and less than or equal to about two grooves per centimeter.

4. The secondary battery of claim 1, wherein the case further comprises:
   a second pressing portion which is opposite to the first pressing portion with the electrode assembly therebetween and applies a second pressing force to the electrode assembly along the first direction,
   opposing side portions respectively connecting the first pressing portion and the second pressing portion to each other, and
   a bottom portion connecting the first pressing portion, the second pressing portion and each of the side portions to each other.

5. The secondary battery of claim 4, wherein the second pressing portion comprises:

a first surface facing a second side surface of the electrode assembly accommodated in the case, the second side surface opposite to the first side surface of the electrode assembly; and a second surface opposite to the first surface of the second pressing portion and exposed outside the case, the second surface of the second pressing portion comprising a plurality of second curved grooves arranged along the second side surface of the electrode assembly accommodated in the case and lengthwise extending along the second direction crossing the first direction.

6. The secondary battery of claim 5, wherein within the second pressing portion, a cross-section of each of the plurality of second curved grooves is one of a semicircle shape, an arch shape and a parabolic shape each comprising a predetermined curvature.

7. The secondary battery of claim 5, wherein within the second pressing portion, a ratio of a depth of each of the plurality of second curved grooves along the first direction to a width of the each of the plurality of second curved grooves along a third direction is equal to or greater than about $1/15$ and less than or equal to about $1/5$.

8. The secondary battery of claim 4, wherein
the case further comprises an opening opposite to the bottom portion and through which an inner space of the case is exposed to outside the case, and
the opening is opposite to the bottom portion along the second direction, with the electrode assembly therebetween,
further comprising a cap plate coupled to the case at the opening, to close the case.

9. The secondary battery of claim 1, wherein the negative electrode layer comprises a lithium (Li) metal or a Li metal alloy.

10. A secondary battery comprising:
an electrode assembly comprising a negative electrode layer, a separation film and a positive electrode layer arranged along a first direction;
a case in which the electrode assembly is accommodated, the case comprising a first exterior wall portion exposed to outside the case and facing a first side surface of the electrode assembly accommodated in the case; and
a first pressing portion which is arranged between the first side surface of the electrode assembly accommodated in the case and the first exterior wall portion of the case and applies a first pressing force to the electrode assembly along the first direction,
wherein the first pressing portion comprises:
a first surface facing the first side surface of the electrode assembly accommodated in the case; and
a second surface opposite to the first surface, the second surface of the first pressing portion comprising a plurality of first curved grooves arranged along the first side surface of the electrode assembly,
wherein within the first pressing portion, the plurality of first curved grooves;
include lengths extended along a second direction crossing the first direction,
are arranged along a third direction crossing each of the first direction and second direction, and
include depths as a maximum dimension along the first direction and widths as a maximum dimension along the third direction,
wherein a ration of a depth of each of the plurality of first curved grooves along the first direction to a width of the each of the plurality of first curved grooves along the third direction is equal to or greater than about $1/15$ and less than or equal along about $1/5$.

11. The secondary battery of claim 10, wherein within the first pressing portion, a cross-section of each of the plurality of first curved grooves is one of a semicircle shape, an arch shape and a parabolic shape each comprising a predetermined curvature.

12. The secondary battery of claim 10, wherein within the first pressing portion,
along the third direction, an arrangement ratio of the plurality of first curved grooves is equal to or greater than about one groove per centimeter and less than or equal to about two grooves per centimeter.

13. The secondary battery of claim 10, wherein the case further comprises:
a second exterior wall portion opposite to the first exterior wall portion,
opposing side portions each connecting the first exterior wall portion and the second exterior wall portion to each other, and
a bottom portion connecting the first exterior wall portion, the second exterior wall portion and each of the side portions to each other.

14. The secondary battery of claim 13, further comprising a second pressing portion which is arranged between a second side surface of the electrode assembly accommodated in the case opposite to the first side surface of the electrode assembly and the second exterior wall portion of the case, and applies a second pressing force to the electrode assembly along the first direction,
wherein the second pressing portion comprises:
a first surface facing the second side surface of the electrode assembly accommodated in the case; and
a second surface opposite to the first surface of the second pressing portion, the second surface of the second pressing portion comprising a plurality of second curved grooves arranged along the second side surface of the electrode assembly accommodated in the case and lengthwise extending along the second direction crossing the first direction.

15. The secondary battery of claim 14, wherein within the second pressing portion, a cross-section of each of the plurality of second curved grooves is one of a semicircle shape, an arch shape and a parabolic shape each comprising a predetermined curvature.

16. The secondary battery of claim 14, wherein within the second pressing portion, a ratio of a depth of each of the plurality of second curved grooves along the first direction to a width of the each of the plurality of second curved grooves along the third direction is equal to or greater than about $1/15$ and less than or equal to about $1/5$.

17. The secondary battery of claim 13, wherein
the case further comprises an opening opposite to the bottom portion and through which an inner space of the case is exposed to outside the case, and
the opening is opposite to the bottom portion along the second direction, with the electrode assembly therebetween,
further comprising a cap plate coupled to the case at the opening to close the case.

18. The secondary battery of claim 10, wherein the negative electrode layer comprises a lithium (Li) metal or a Li metal alloy.

* * * * *